United States Patent
Benim et al.

(10) Patent No.: US 6,790,797 B1
(45) Date of Patent: Sep. 14, 2004

(54) INSULATING AND FOOTWEAR SYSTEM

(75) Inventors: Thomas E. Benim, Kinston, NC (US); Susan C. Chamberlin, Wilmington, DE (US); Roger Franklin Parry, Moseley, VA (US)

(73) Assignee: Invista North America S.a.r.l., Wilmington, DE (US)

( * ) Notice: Subject to any disclaimer, the term of this patent is extended or adjusted under 35 U.S.C. 154(b) by 0 days.

(21) Appl. No.: 09/547,855

(22) Filed: Apr. 12, 2000

Related U.S. Application Data

(60) Provisional application No. 60/129,413, filed on Apr. 15, 1999.

(51) Int. Cl.[7] .............................. D04H 1/00; D04H 5/00; D04H 3/00; D04H 13/00; B32B 5/06; B32B 5/26; B32B 7/08; A43B 23/07
(52) U.S. Cl. ........................ 442/335; 442/337; 442/381; 442/387; 442/388; 36/55
(58) Field of Search ................................ 442/335, 337, 442/361, 364, 381, 387, 388, 124; 36/55, 10

(56) References Cited

U.S. PATENT DOCUMENTS

| | | | |
|---|---|---|---|
| 2,637,893 A | 5/1953 | Shaw | |
| 2,945,739 A | 7/1960 | Lechmicke | |
| 3,156,085 A | 11/1964 | Jamieson | |
| 3,249,699 A | 5/1966 | Jamieson | |
| 3,271,189 A | 9/1966 | Hofmann et al. | |
| 3,454,422 A | 7/1969 | Mead et al. | |
| 3,488,217 A | 1/1970 | Ryan, Jr. et al. | |
| 3,918,399 A | * 11/1975 | Fox et al. ................. | 118/308 |
| 4,146,674 A | 3/1979 | Salamon et al. | |
| 4,707,407 A | * 11/1987 | Clark et al. ................. | 428/361 |
| 4,713,289 A | 12/1987 | Shiffler | |
| 4,818,599 A | 4/1989 | Marcus | |
| 4,869,771 A | 9/1989 | LeVan | |
| 4,954,398 A | 9/1990 | Bagrodia et al. | |
| 5,057,368 A | 10/1991 | Largman et al. ............ | 428/397 |
| 5,172,495 A | * 12/1992 | Fehlhaber et al. ............. | 36/55 |
| 5,334,176 A | 8/1994 | Buenger et al. | |
| 5,443,776 A | * 8/1995 | Bartholomew et al. ..... | 264/168 |
| 5,478,635 A | * 12/1995 | Travis et al. ................ | 428/221 |
| 5,626,961 A | 5/1997 | Aneja | |
| 5,753,166 A | 5/1998 | Dalton et al. .......... | 264/117.13 |
| 5,874,164 A | * 2/1999 | Caldwell ..................... | 442/76 |
| 5,938,648 A | * 8/1999 | LaVon et al. ............... | 604/358 |
| 6,037,057 A | 3/2000 | Hartzog et al. | |
| 6,555,490 B1 | * 4/2003 | Wildbore et al. .......... | 442/388 |

FOREIGN PATENT DOCUMENTS

| | | | |
|---|---|---|---|
| GB | 2 314 097 A | 12/1997 | |
| GB | 1 597 143 A | 10/1998 | |
| JP | 53-94001 | 8/1978 | |
| JP | 58-214585 | 12/1983 | |
| RO | 346929 | 12/1998 | |
| WO | WO 9607783 A1 | * 3/1996 | ......... D04H/13/00 |
| WO | WO 98/28476 | 12/1996 | |
| WO | WO 98/35574 | 2/1997 | |
| WO | WO 98 29000 A | 7/1998 | |

* cited by examiner

Primary Examiner—Elizabeth M. Cole
Assistant Examiner—Jeremy R Pierce
(74) Attorney, Agent, or Firm—Charles E. Krukiel

(57) ABSTRACT

A system, for example a footwear system, with moisture transport properties includes an insulating layer, which has transport properties, coupled to a fabric lining fabric with moisture transport properties. Antimicrobial efficacy can also be obtained by adding anti-bacterial treatments to the insulation and the lining, where the treatments could be anti-bacterial fibers, applications, or other technologies.

1 Claim, 2 Drawing Sheets

INSULATING AND FOOTWEAR SYSTEM

CROSS-REFERENCE TO RELATED APPLICATIONS

This application claims the benefit of priority from U.S. provisional application 60/129,413, filed Apr. 15, 1999, which is hereby incorporated by reference in its entirety.

BACKGROUND OF THE INVENTION

1. Field of the Invention

The present invention relates to an insulating system, such as a footwear system, with moisture transport properties including an insulating batting and a fabric lining. The insulating system or footwear system may have antimicrobial efficacy, due to the fact that the insulating batting may also comprise antimicrobial fibers and/or the fabric lining may also have antimicrobial efficacy. The invention also relates to a footwear or insulating system including a non-woven densified material.

2. Description of the Related Art

There has been increased interest in recent years in incorporating additional performance features into footwear and garments beyond that of insulating and cushioning materials. To this end, developments in moisture management assemblies and anti-microbial treatments for footwear materials have been pursued.

WO 98/28476, discloses utilizing Eastman 4DG transport fibers in non-woven applications for footwear. The WO 98/28476 application discloses use of a nonsymmetrical multi-grooved transport fiber. WO 98/28476 shows that this fiber is insufficient in use due to pilling and durability in use. WO 98/28476 claims as an improvement to this product a non-woven felt liner which is designed to be a replacement liner. This liner is a thermal bonded (binder fiber addition) version of 4DG (and CoolMax®) needled to a density of 150–160kg/m$^3$. However, this high density felt produces a product which does not have good moisture transport properties. Moreover, this is very stiff product, which has to be very thin, and is thus not particularly durable.

There is thus a continuing desire to provide materials and systems having improved insulating and/or moisture transport properties.

SUMMARY OF THE INVENTION

In accordance with these needs, the present invention provides a system that includes an insulating layer, which has moisture transport properties, coupled to a liner fabric with transport properties, which can be tailored, for example, by appropriate selection of materials, for higher wear durability than the regular non-woven liner of the prior art. Antimicrobial efficacy can also be obtained by adding antimicrobial treatments to the insulation and/or the liner, where the treatments could be antimicrobial fibers, applications, or other technologies.

According to the present invention, there is provided an insulating system for garments such as footwear and other articles in which an insulating system is desirable, hereunto referred to as the insulating system. The insulating layer component of the insulating system is characterized as a non-woven of a density of about 40 to 90 kg/m$^3$ and composed of fibers that are of cruciform cross section, being either untreated or treated with a silicone surface modifier, are combinations of either untreated or treated with a silicone surface modifier cruciform cross section fibers and antimicrobial fibers, are combinations of untreated and treated with a silicone surface modifier cruciform cross section fibers, are combinations of untreated and treated with a silicone surface modifier cruciform cross section fibers and antimicrobial fibers, or all of the above variations combined with thermal binding fibers in a proportion of from about 0% to about 25%. The antimicrobial agents discussed above may be combined with the silicone surface modifier. Although the present invention preferentially uses polyester, such as poly(ethylene) terephthalate, as the cruciform fibers, the cruciform fibers could alternatively be produced from polyamide, polyolefin, aramids or other fibers that can be produced in cruciform or other cross sections, with, for example, grooves or lobes, allowing for the transport of water. The lining component of the system is characterized in that the liner has moisture transport properties, or that the liner has moisture transport properties and antimicrobial properties.

When used in footwear, the insulating system is preferably the innermost layer of the footwear construction. The liner fabric is preferably the part of the footwear which comes in contact with a foot or sock.

The system is further characterized by an attachment mechanism, either mechanical such as sewing, thermal such as point and ultrasonic bonding, or chemical adhesive that allows moisture transport between the liner and insulating layer.

The invention also provides an insulating system which is a non-woven densified material, which comprises a wicking fiber, such as a polyester with a cruciform cross-section, a binder fiber, and an antimicrobial fiber or agent. This insulating system may be used as an insulating layer in garments and other articles in which an insulating system is desirable. For example, the insulating system may be used in footwear such as in the tongue, sole and/or vamp.

According to the invention, there is also provided a system comprising an insulating batting comprising a non-woven densified material, combined, by chemical, mechanical or thermal means, with an abrasion resistant fabric lining that exhibits moisture transport properties.

In another embodiment, the invention relates to footwear, apparel, or an insulating layer comprising a non-woven material that comprises a cruciform cross-section polyester fiber. In a preferred embodiment, the non-woven material is a densified material.

In another embodiment, there is provided a non-woven insulating system comprising a wicking fiber, a binder fiber, and an antimicrobial fiber or agent. Preferably, the wicking fiber comprises a polyester with a multilobed or a multi-grooved cross section, such as a cruciform cross section.

DETAILED DESCRIPTION OF THE PREFERRED EMBODIMENTS

Figure 1:
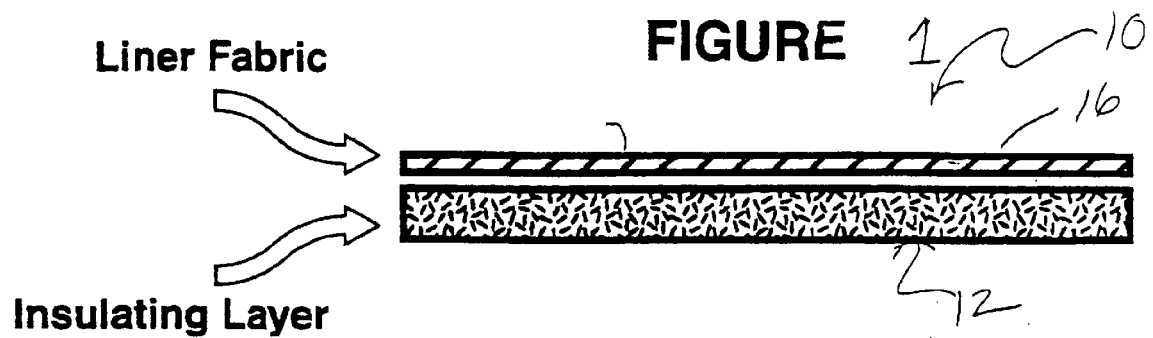
FIG. 1 is a schematic, cross-sectional view of the footwear system of the present invention.

In accordance with one aspect of the present invention, there is provided an insulating and lining system for garments such as footwear and other articles in which an insulating and lining system is desirable. Such an insulating system is shown generally at 10 in FIG. 1. The system includes an insulating batting, shown at 12 in FIG. 1. The insulating batting comprises a non-woven densified material. This material may be a cruciform cross-section polyester fiber. Such polyester cruciform cross section fiber is shown at 14 in FIG. 2. Cruciform cross-section fibers are disclosed, for example, in U.S. Pat. Nos. 2,945,739 and 4,713,289 which are both herein incorporated by reference. The fiber can be processed to form the insulating batting as desired. For example, this fiber is cut into 1.5 inch to 3.0 inch staple length, garnetted or carded into a web. The web is built into a batting by cross lapping multiple layers, densified by standard non-woven needlepunching methods to arrive at a fiber density of 40 to 90 kg/m$^3$.

The cruciform fibers may be in the range 0.7 to 6.0 denier per filament (dpf) and may or may not contain a portion of fibers that are slickened or coated with a durable (i.e., wash resistant) coating that is usually a silicone, i.e., a cured polysiloxane or amine-functional polysiloxane as disclosed, e.g., by Hofmann U.S. Pat. No. 3,271,189, Mead et al U.S. Pat. No. 3,454,422; Ryan U.S. Pat. No. 3,488,217; Salamon et al U.S. Pat. No 4,146,674; LeVan U.S. Pat. No. 4,869,771; Takemoto Oil and Fat Co., Ltd, Japanese Published Application No 58-214,585 (1983); or other types such as the polyalkylene oxide variety disclosed by, e.g., Marcus U.S. Pat. No. 4,818,599, all of which are herein incorporated by reference. If slickened cruciform fibers are present, they are generally present in an amount of about 5-70%, more preferably about 10-50%, by weight based on the total weight of the insulating layer. In a preferred embodiment, no slickened cruciform fibers are present.

Figure 3:
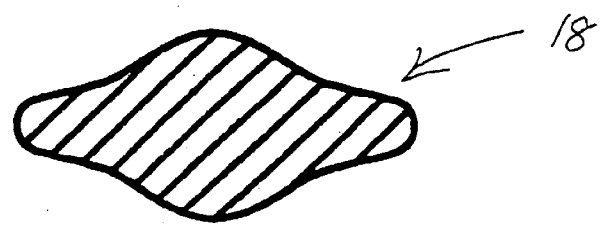
FIG. 3 is a schematic, cross-sectional view of a first scalloped oval fiber used with the present invention.
Figure 4:
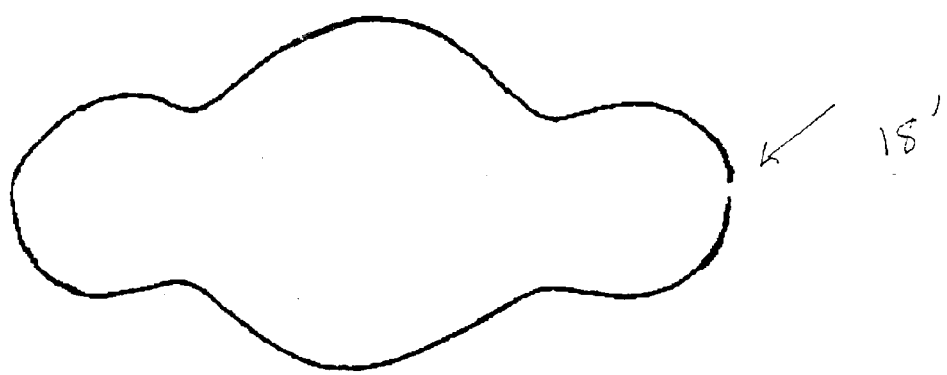
FIG. 4 is a schematic, cross-sectional view of a second scalloped oval fiber used in the present invention.

In place of or in addition to the cruciform fibers, any desired fiber that can provide desired wicking properties can be used. For example, a fiber having grooves and/or lobes allowing moisture to travel can be used. For example, the scalloped fiber of FIG. 3 or 4 can be used. The fiber can be any type of fiber, such as a polyester, nylon or polyolefin.

With the batting of the present invention, thermal bonding fibers may be substituted by about 0–25% by weight of the cruciform cross-section fibers and heat activated for fiber-to-fiber bonding. For example, the thermal boding fibers can be present in an amount of about 5 to about 50%, preferably about 15–30%, by weight of the insulating layer. In some embodiments, the thermal bonding fibers which are preferably 4.0 dpf sheath core bicomponent fibers of the type where the sheath is a low melt polyester, such as that available from Unitika as Melty 4080 cut to about 1.5 to 3.0 inch, are blended into the cruciform fiber at up to 25% by weight, then garnetted or carded into a web, following the same forming process as described above with respect to the cruciform fibers. In addition, the binder fiber is activated by passing the needle formed batting through a bonding oven, at approximately 280–300° F. for about 3–5 minutes. Suitable binder fibers are well known in the art and include polyesters and polyolefins. If a thin, dense and strong batting is desired, the bonding fibers can be present in an amount greater than about 25% by weight, such as up to 70% of the cruciform cross-section fibers.

Alternatively, antimicrobial functional fibers may be substituted for up to 30% by weight of the cruciform fibers, so that the batting may comprise either cruciform fibers, optionally with an antimicrobial fiber, optionally with binder fibers. Preferably about 0–40% or 1–25%, more preferably about 5–20%, by weight of the antimicrobial fibers are present based on the weight of the insulating layer. Any desired antimicrobial fiber can be used. For example, the antimicrobial fibers can be a sheath core polyester with the antimicrobial agent particles included in the sheath portion of the fiber as disclosed in U.S. Pat. No. 6,037,057, which is herein incorporated by reference. In some embodiments, antimicrobial fibers with a cut length of 1.5 inch to 3.0 inch staple length are used. The fibers are then processed as described above with respect to the cruciform fibers.

Antimicrobial activity can be determined by using the Dow Corning Corporate Test Method 0923 "Antimicrobial Activity—Dynamic Test of Surfaces" which is commonly referred to as the "Shake Flask" test which is described in U.S. Pat. No. 6,037,057, which is incorporated herein by reference.

As discussed above, the insulating layer can include 100% cruciform or other fibers with a cross-section with grooves or lobes that have wicking properties, or a portion of the cruciform fibers can be replaced with bonding fibers and/or antimicrobial fibers. For example, the insulating layer can contain about 2 to about 40% antimicrobial fibers, about 5 to about 50% binder fibers, and about 50 to about 90% cruciform fibers each based on the weight of the insulating layer. The insulating layer may have a basis weight of about 100–800 g/m$^2$.

In some embodiments, the insulating or footwear system of the present invention further includes an abrasion resistant fabric lining that exhibits moisture transport properties. Such a lining is shown at 16 in FIG. 1. Any desired lining can be used. The lining may comprise thermal point bonded non-woven structures produced from bicomponent sheath core nylon fibers wherein the outer sheath comprises nylon 6 and the core comprises nylon 6,6. Alternatively, the following fibers may be substituted for up to 50% of the nylon sheath-core bicomponent fibers: blends of nylon 6 and the aforementioned bicomponent; blends of nylon 6,6 and the aforementioned bicomponent; blends of nylon 6, nylon 6,6 and the aforementioned bicomponent; bicomponents as described above available commercially as Cambrelle®, polyester scalloped oval fibers commercially available as CoolMax®. The Cambrelle® fiber is calender embossed or thermal point bonded. Also, nylon 6 and/or nylon 6,6 can be substituted with up to 50% of the nylon sheath-core bicomponent fibers.

Antimicrobial fibers may be substituted from about 0–50% of the nylon sheath-core bicomponent fibers. In a preferred embodiment, the fabric lining includes antimicrobial fibers of about 2–40%, preferably about 15 to about 25% by weight based on the weight of the lining. It should be noted that, instead of using antimicrobial fibers, the nylon or other type of fibers may alternatively be treated to impart antimicrobial properties.

The antimicrobial fibers useful in either layer may include a sheath-core polyester fiber where the sheath includes an antimicrobial agent and the sheath comprises less than 30% of the total cross-sectional area of the fiber. The optional antimicrobial agent may be selected such that the relative viscosity of the fiber lies above a defined spinnability limit. The antimicrobial fiber may be slickened or coated with a siliconized finish. An example of such antimicrobial fibers is described in U.S. Pat. No. 6,037,057, which is herein incorporated by reference. Alternatively, the cruciform fiber or nylon fibers or other fiber used in the layers may be treated with an antimicrobial agent during manufacture to impart the desired antimicrobial activity.

The antimicrobial fibers useful in either layer can be acrylic fibers that have been treated with triclosan which is manufactured by CIBA under the tradename IRGASAN and Tolnaftate® with is an antifungal agent manufactured by Fermion. Antimicrobial activity of these fibers may be determined by known methods such as AATCC 147, "Parallel Streak Test", SNV 195–921 Test, and SNV 195–920 Test.

Alternatively to including antimicrobial fibers in the insulating layer, the batting can be treated with a topically applied antimicrobial agent such as 3-(trimethoxysilyl) propyloctadecyldimethyl ammonium chloride in a <1% methanol, water, glycol mixture during the course of manufacture of the batting, such as either just before or just after the bonding oven.

Thus antimicrobial property can be provided by fibers of cruciform cross-section which have been treated or coated with a topically applied antimicrobial agent, such as 3-(trimethoxysilyl)propyloctadecyldimethyl ammonium chloride in a <1% methanol, water, glycol mixture, available as Aegis Micro Shield™, Goulston Lurol AMS, Aegis 5772, and SYLGARD™. Other useful topical agents comprise tributytin meleate compounds such as Ultra Fresh™ by Thompson Research Associates. The antimicrobial agent may be applied to the fiber during various stages in the process such as after drawing and before relaxation or after relaxation. Additionally, the treatment may be combined with or carried by a silicone surface modifier.

In the insulating system of the invention, fibers coated with an antimicrobial agent may be included in the lining, the batting or both. The fibers, lining, batting or a combination thereof may be topically treated with an antimicrobial agent during the manufacture of the insulating system, such as before or after the layers are bonded together. The antimicrobial agent may be applied by standard application methods known in the art such as by spraying the agent on to the fibers, submersing the fibers in the agent or contacting the fibers with a device which transfers the agent to the fibers. In some embodiments, the antimicrobial agent is applied to achieve a residual add-on weight in an amount of about 0.1 to about 0.2% weight of the fiber.

Figure 2:
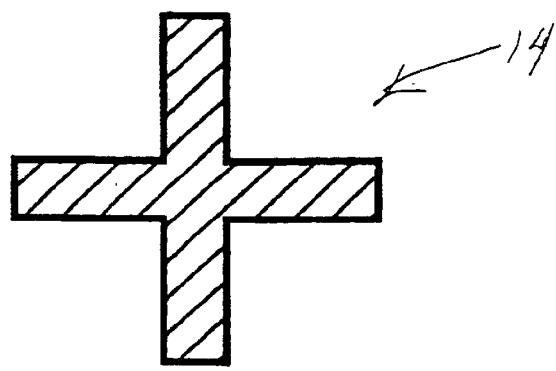
FIG. 2 is a schematic, cross-sectional view of a cruciform cross section fiber useful in the batting of the present invention.

The lining may comprise knits, wovens, or non-woven fabrics made from polyester cruciform cross-section fibers, one such fiber being shown in FIG. 2. Alternatively or additionally, the lining may comprise knits, wovens, or non-woven fabrics made from polyester scalloped oval cross-section fibers, one such fiber being shown at 18 in FIG. 3. Another useful scalloped cross-section is shown at 18' in FIG. 4. The lining is formed into a fabric utilizing any standard textile method including, but not limited to woven, knit, or non-woven processes. The liner may comprise a range of different fiber types. For example, the liner may comprise a mixture of about 1–25% of an antimicrobial fiber and a wicking fiber which may be multi-lobed fiber such as a cruciform shaped fiber.

For the embodiment where antimicrobial efficacy is developed, the lining material may incorporate fibers, treatments, or other technologies that impart antimicrobial efficacy.

The aforementioned batting and lining are intimately combined into a system by, e.g., mechanical means such as quilting or sewing; by thermal bonding means including, but not limited to ultrasonic bonding, thermal bonding fibers and tapes, and thermal welding; by chemical bonding means including, but not limited to the use of resins, glues, and adhesives. The combination of the batting and the lining should be selected to preserve the moisture transport properties of each layer, e.g. by use of discontinuous binding methods.

A preferred embodiment of the insulating system comprises a liner fabric made with a blend of bicomponent sheath core fibers with acrylic fibers that have been treated with antimicrobial agents, which liner fabric is a non-woven that is calendered to have a suitable strength and surface finish and an insulating batting layer composed of about 5–20%, preferably about 10% antimicrobial polyester fibers, about 5–50%, preferably about 18% sheath core binder fibers, and about 50–95%, preferably about 72% cruciform shaped fibers. The two layers may be combined by ultrasonic bonding in any of the several quilting patterns. Alternatively, the layers may be combined with an adhesive. Suitable binding methods include but are not limited to gravure printing, and mesh interlining adhesives.

The insulating system of the present invention is not limited to use in footwear, but can be used anywhere insulating and moisture transport properties are desired. Examples of such applications include ski-wear, apparel, mattress pads, sleeping bags, camping packs, knee-pads and covers, head wear, and food transport bags.

In the insulating system of the invention, the batting and lining can be arranged in any desired manner, so long as at least one batting and one lining layer are combined and the desired moisture transport properties are achieved. There can be one or more of batting and/or lining layers.

The invention also relates to the use of a non-woven densified material comprising a cruciform cross-section polyester fiber in footwear or other applications desiring moisture transport properties, without requiring a fabric lining. The cruciform fiber can optionally be combined with the types and amounts of binder and/or antimicrobial fibers as discussed above. The use of the cruciform cross section fibers provide superior moisture transport properties as compared to conventionally used material.

EXAMPLES

The invention is illustrated by the following non-limited examples.

Insulating Layers

Blend A is a non-woven batting made with about 53% non-siliconized 2.5 denier, about 21% siliconized 2.5 denier cruciform fiber, about 16% polyester sheath/core binder fiber, and about 10% sheath/core polyester antimicrobial fiber as described in U.S. Pat. No. 6,037,057, which is herein incorporated by reference. The batting is produced by carding or garnetting a web, which is then crosslapped to achieve a batting with the desired areal density. The batting is then needlepunched to achieve the thickness desired. The batting is then passed through an oven to melt the low melting portion of the binder fibers. The carding, needle punching and thermal bonding are done by processes well known in the art.

Blend B is a non-woven batting made with the following cut staple fibers: about 53% 2.5 dpf cruciform non-siliconized polyester fiber, about 25% 4 dpf sheath/core polyester binder fiber, and about 18% sheath/core polyester antimicrobial fiber as described in U.S. Pat. No. 6,037,057, which is herein incorporated by reference. The batting is produced by carding or garnetting a web, which is then crosslapped to achieve a batting with the desired areal density. The batting is then needlepunched to achieve the thickness desired. The batting is then passed through an oven to melt the low melting portion of the binder fibers. The carding, needle punching and thermal bonding are done by processes well known in the art.

Blend C is a non-woven batting made with the following cut staple fibers: about 72% 2.5 dpf cruciform non-siliconized polyester fiber, about 18% 4 dpf sheath/core polyester binder fiber, and about 10% sheath/core polyester antimicrobial fiber as described in U.S. Pat. No. 6,037,057, which is herein incorporated by reference. The batting is produced by carding or garnetting a web, which is then crosslapped to achieve a batting with the desired areal density. The batting is then needlepunched to achieve the thickness desired. The batting is then passed through an oven to melt the low melting portion of the binder fibers. The carding, needle punching and thermal bonding are done by processes well known in the art.

Fibers

The cruciform fibers in the following examples were spun from commercial polyester polymer by using methods known in the art and as described in, for example, U.S. Pat. Nos. 3 0 2,945,739 and 4,713,289, both of which are herein incorporated by reference. The fiber was drawn, crimped via stuffer box and relaxed using polyester fiber production methods known in the art. The fibers have a dpf of about 2.5.

The binder fibers in the following examples was a 4 dpf core/sheath poly(ethylene)terepthalatefisopthalate such as Unitika M4080 and Sam Yang LM-51 fibers.

The antimicrobial fiber in the following examples was a 6 dpf sheath/core polyester as described in Example 1 of U.S. Pat. No. 6,037,057, which is herein incorporated by reference.

Bonding Method

The adhesive process used in all of the examples that refer to bonding, except for Example 13, was a hot melt moisture curing polyurethane adhesive applied to the liner fabric in a dot pattern via a gravure printing process. The adhesive was applied in a dot pattern at a rate of about 11 g/m² and in a manner to leave about 60% of the fabric open for permeability. The type and amount of adhesive may be varied to suit a particular application. It is preferred that the type and amount of adhesive applied does not inhibit the moisture transport properties of the liner and batting and the transport of moisture between the liner and batting, such as a non-continuous layer of adhesive that leaves, for example, about 5% to about 90% of the fabric open.

Ultrasonic attachment was used in Example 13. In this process, the materials are bonded together by heat and pressure of short duration, with such heat and pressure generated by ultrasonic energy. This bonding method is an alternative to mechanical and chemical attachment methods and is often used to combine non-woven materials. In Example 13, the bond pattern was in a square pattern of about 1.5 inches and comprised intermittent bonded points in a dashed line. Other patterns may be used for style or different bonding strength. The amount of bonding may be varied depending on the desired characteristics. The amount of bonding is in a range which does not inhibit the moisture transport properties of the liner and batting and the transport of moisture between the liner and batting. A preferred range of bonding includes a square pattern of about 0.5 inches to about 4.0 inches. Ultrasonic equipment suitable for this ultrasonic bonding method are commercially available from several manufactures.

Q Liner Layer

Cambrelle®+is the commercial tradename for a non-woven nylon fabric produced and sold by Camtex Fabrics Ltd. (Dupont Co.). The fabric used in the example is composed of 80% by weight polyamide heterofil (nylon 6, nylon 6'6) and 20% by weight acrylic antimicrobial/antifungal (Amicor Plus fibre from Acordis). The fabric is thermally heat bonded by calender process. The fabric is about 160 g/m².

Coolmax® fabric used in the following examples was made with 100% scalloped oval polyester staple fibers, knit in a fabric of about 100 g/m².

Experimental Protocols

In the following examples, weight was measured by cutting a one square foot piece of material and weighing on a lab balance. The thickness was measured by using a device known as a Measurematic as described in ASTM D5736 using a pressure of 0.002 PSI. Batting was measured in inches and equivalent thickness in mm was calculated. The batting density was calculated using the weight, and thickness of the sample in one square foot pieces. CLO was measured using Lambda 2300F Heat Flow Meter, a device which meets ASTM C518. Wicking height was measured using Dupont Test TM 1428–99 "Fabric Wicking Rate Vertical Suspension." In this method, vertically suspended specimens are immersed to a given depth in water. At specified time intervals, the distance that the water has traveled up the specimen is measured. The wicking height is the average of 3 samples cut to 1 inch width by 7 inches. Two samples are cut in the machine direction and two samples are cut in the cross direction. In cases of layered samples, the average of the front and back side of the sample was determined. The properties of the following examples are illustrated in Table 1.

Example 1

An insulating batting structure composed of 10% antimicrobial polyester fibers, 18% sheath core binder fibers, and 72% cruciform shaped fibers was produced. (Blend C). The batting a layer has a basis weight of 180 g/m².

Example 2

An insulating batting structure composed of 10% antimicrobial polyester fibers, 18% sheath core binder fibers, and 72% cruciform shaped fibers was produced. (Blend C). The batting layer has a basis weight of 372 g/m².

Example 3

An insulating batting structure composed of 10% antimicrobial polyester fibers, 18% sheath core binder fibers, and 72% cruciform shaped fibers was produced. (Blend C). The batting layer has a basis weight of 540 g/m².

Example 4

A batting layer having a basis weight of 180 g/m² comprising 10% antimicrobial polyester fibers, 18% sheath core binder fibers, and 72% cruciform shaped fibers (Blend C) was bonded to a non-woven liner Cambrelle®+fabric.

Example 5

A batting layer having a basis weight of 372 g/m² comprising 10% antimicrobial polyester fibers, 18% sheath core binder fibers, and 72% cruciform shaped fibers (Blend C) was bonded to a non-woven liner Cambrelle®+fabric.

Example 6

A batting layer having a basis weight of 540 g/m2 comprising 10% antimicrobial polyester fibers, 18% sheath core binder fibers, and 72% cruciform shaped fibers (Blend C) was bonded to a non-woven liner Cambrelle®+fabric.

Example 7

An insulating batting structure composed of 10% antimicrobial polyester fibers, 16% sheath core binder fibers, 53% dry cruciform shaped fibers, and 21% slickened cruciform fibers was prepared (Blend A). The batting layer has a basis weight of 340 g/m².

Example 8

An insulating batting structure composed of about 18% sheath core binder fibers, about 53% dry cruciform shaped fibers, and about 25% slickened cruciform fibers was prepared (Blend B). The batting layer has a basis weight of 234 g/m².

Example 9

A batting layer having a basis weight of 340 g/m² comprising 10% antimicrobial polyester fibers, 16% sheath core binder fibers, 53% dry cruciform shaped fibers, and 21% slickened cruciform fibers (Blend A) was bonded to a knit CoolMax® liner fabric.

Example 10

A batting layer having a basis weight of 234 g/m² comprising about 18% sheath core binder fibers, about 53% dry cruciform shaped fibers, and about 25% slickened cruciform fibers (Blend B) was bonded to a knit CoolMax® liner fabric.

Example 11

A batting layer having a basis weight of 340 g/m² comprising 10% antimicrobial polyester fibers, 16% sheath core binder fibers, 53% dry cruciform shaped fibers, and 21% slickened cruciform fibers (Bend A) was bonded to a non-woven liner Cambrelle®+fabric.

Example 12

A batting layer having a basis weight of 234 g/m² comprising about 18% sheath core binder fibers, about 53% dry cruciform shaped fibers, and about 25% slickened cruciform fibers (Blend B) was bonded to a non-woven liner Cambrelle®+fabric.

Example 13

A system comprising an insulating batting layer composed of Blend B bonded to a non-liner fabric made of Cambrelle®+. The system has a basis weight of 370 g/m². The layers are combined using ultrasonic bonding in a square (or diamond) quilt pattern approximately 1.5×1.5 inches (38 ×38 mm).

TABLE I

| EXAMPLE | WEIGHT (g) | THICKNESS (mm) | BATTING DENSITY (g/m²) | CLO | WICKING HEIGHT (mm) | INSULATING LAYER (g/m²) | ATTACHMENT METHOD | LINER LAYER |
|---|---|---|---|---|---|---|---|---|
| 1 | 180 | 5.3 | 33.7 | 0.75 | 49 | 200 Blend C | NA | NA |
| 2 | 372 | 6.3 | 58.6 | 0.96 | 24 | 400 Blend C | NA | NA |
| 3 | 540 | 8.1 | 66.4 | 1.29 | 28 | 600 Blend C | NA | NA |
| 4 | 346 | 5.1 | 33.7 | 1.06 | 45 | 200 Blend C | Adhesive | Cambrelle ® + |
| 5 | 582 | 7.1 | 58.6 | 1.08 | 23 | 400 Blend C | Adhesive | Cambrelle ® + |
| 6 | 790 | 8.6 | 66.4 | 1.38 | 29 | 600 Blend C | Adhesive | Cambrelle ® + |
| 7 | 241 | 5.6 | 43 | 0.77 | 37 | 200 Blend A | NA | NA |
| 8 | 234 | 5.3 | 44.2 | 0.72 | 30 | 200 Blend B | NA | NA |
| 9 | 340 | 5.1 | 43 | 1 | 46 | 200 Blend A | Adhesive | Coolmax ® |
| 10 | 314 | 5.1 | 44.2 | 1 | 36 | 200 Blend B | Adhesive | Coolmax ® |
| 11 | 388 | 4.8 | 43 | 0.89 | 53 | 200 Blend A | Adhesive | Cambrelle ® + |
| 12 | 371 | 4.6 | 44.2 | 0.96 | 6 | 200 Blend B | Adhesive | Cambrelle ® + |
| 13 | 370 | 4.6 | 45.6 | 0.91 | 119 | 200 Blend B | Ultrasonic | Cambrelle ® + |

What is claimed is:

1. An insulating and lining system for footwear comprising: an insulating batting comprising a non-woven densified material of cruciform cross-section polyester fibers of a denier of about 0.7 denier per filament to about 6.0 denier per filament and having a density of about 40 to about 90 kilograms per square meter, combined, by chemical, mechanical, or thermal means, with an abrasion resistant fabric lining having a foot or sock contacting surface and an insulating batting contacting surface and wherein said lining exhibits moisture transport properties and wherein the lining comprises knits, wovens, or non-woven fabrics made from about 75% to 99% polyester cruciform cross-section fibers.

* * * * *